(12) United States Patent
Jimenez et al.

(10) Patent No.: US 12,449,676 B2
(45) Date of Patent: Oct. 21, 2025

(54) ELECTRICALLY CONDUCTIVE LAMINATED LENS FOR EYEWEAR AND FRAME ASSEMBLY THEREFOR

(71) Applicant: Oakley, Inc., Foothill Ranch, CA (US)

(72) Inventors: Luis M. Jimenez, Irvine, CA (US); Christopher John Anderson, Mission Viejo, CA (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 17/549,342

(22) Filed: Dec. 13, 2021

(65) Prior Publication Data

US 2022/0179241 A1 Jun. 9, 2022

Related U.S. Application Data

(62) Division of application No. 16/206,780, filed on Nov. 30, 2018.
(Continued)

(51) Int. Cl.
| | |
|---|---|
| *G02C 7/10* | (2006.01) |
| *G02C 1/06* | (2006.01) |
| *G02C 11/08* | (2006.01) |
| *G02F 1/1333* | (2006.01) |
| *G02F 1/1343* | (2006.01) |

(Continued)

(52) U.S. Cl.
CPC ............... *G02C 7/101* (2013.01); *G02C 1/06* (2013.01); *G02C 11/08* (2013.01); *G02F 1/133382* (2013.01); *G02F 1/13439* (2013.01); *G02F 1/1347* (2013.01); *G02F 1/1533* (2013.01); *G02C 2202/16* (2013.01); *G02F 2202/28* (2013.01)

(58) Field of Classification Search
CPC .......... G02C 1/06; G02C 7/101; G02C 11/08; G02C 2202/16; G02F 1/133382; G02F 1/13439; G02F 1/1347; G02F 1/1533; G02F 1/155; G02F 1/157; G02F 2202/28
USPC ................ 351/47, 57, 83–89, 159.39, 159.4, 351/159.6–159.63, 159.65, 159.66, 351/159.68, 159.73; 359/245, 265, 270, 359/273

See application file for complete search history.

(56) References Cited

U.S. PATENT DOCUMENTS

| | | | |
|---|---|---|---|
| 4,386,832 A * | 6/1983 | Nannini | G02C 7/12 |
| | | | 351/86 |
| 7,452,068 B2 * | 11/2008 | Collier | G02C 5/12 |
| | | | 351/57 |

(Continued)

FOREIGN PATENT DOCUMENTS

| | | | | |
|---|---|---|---|---|
| WO | WO-2008033290 A2 * | 3/2008 | ............. | G02C 7/101 |
| WO | WO-2016077431 A2 * | 5/2016 | ............. | G02C 7/101 |

*Primary Examiner* — Mahidere S Sahle
(74) *Attorney, Agent, or Firm* — Sterne, Kessler, Goldstein &Fox P.L.L.C.

(57) ABSTRACT

Embodiments of the present disclosure are directed to eyewear (e.g., goggles, eye glasses, sun glasses, helmet shields, helmet visors, etc.) that can maximize the wearer's field of view when laminated lenses having electrically conductive functional layers (e.g., electrochromic and/or heating layers) are used. Improved field of view can be accomplished by means of reducing the bezel size of the laminated lens. For example, the bezel's non-transparent footprint can be reduced by stacking electronic components at a peripheral edge of the lens and securing with a frame assembly rather than a separate edge seal.

22 Claims, 14 Drawing Sheets

Related U.S. Application Data

(60) Provisional application No. 62/621,779, filed on Jan. 25, 2018.

(51) Int. Cl.
  *G02F 1/1347* (2006.01)
  *G02F 1/153* (2006.01)

(56) References Cited

U.S. PATENT DOCUMENTS

| | | | |
|---|---|---|---|
| 7,810,174 B2 * | 10/2010 | Matera | A61F 9/025 |
| | | | 351/86 |
| 8,770,749 B2 | 7/2014 | McCabe et al. | |
| 10,295,821 B2 | 5/2019 | McCabe | |
| 11,199,728 B2 | 12/2021 | Jimenez et al. | |
| 2004/0111788 A1 * | 6/2004 | Chou | A63B 33/004 |
| | | | 2/426 |
| 2005/0195488 A1 * | 9/2005 | McCabe | G02B 5/085 |
| | | | 359/603 |
| 2007/0024806 A1 * | 2/2007 | Blanshay | G02C 11/08 |
| | | | 351/62 |
| 2009/0262411 A1 | 10/2009 | Karmhag et al. | |
| 2013/0091623 A1 * | 4/2013 | McCulloch | A61F 9/025 |
| | | | 2/435 |
| 2013/0235323 A1 | 9/2013 | Sotzing et al. | |
| 2014/0133005 A1 | 5/2014 | Sbar et al. | |
| 2014/0327871 A1 * | 11/2014 | Hall | G02C 11/08 |
| | | | 351/158 |
| 2017/0128267 A1 * | 5/2017 | Rees | A61F 9/027 |
| 2018/0052319 A1 | 2/2018 | McCabe | |
| 2019/0227347 A1 | 7/2019 | Jimenez et al. | |

* cited by examiner

ELECTRICALLY CONDUCTIVE LAMINATED LENS FOR EYEWEAR AND FRAME ASSEMBLY THEREFOR

CROSS-REFERENCE TO RELATED APPLICATIONS

This application is a divisional of U.S. application Ser. No. 16/206,780, filed on Nov. 30, 2018, titled ELECTRICALLY CONDUCTIVE LAMINATED LENS FOR EYEWEAR AND FRAME ASSEMBLY THEREFOR, which claims the benefits of priority of U.S. Provisional Patent Application 62/621,779, filed Jan. 25, 2018, titled ELECTRICALLY CONDUCTIVE LAMINATED LENS FOR EYEWEAR AND FRAME ASSEMBLY THEREFOR. The entire contents of the above-referenced applications are incorporated by reference herein and made part of this specification.

BACKGROUND

Field

Embodiments of the present invention generally relate to eyewear having electrically conductive lenses and electrical connections structured to maximize the wearer's field of view.

Background

Laminated lenses having electrically conductive layers, such as electrochromic and/or heating functional layers, require electrodes and electrical connections (wiring) to an external power supply. Keeping the electrical components out of the user's field of view (e.g., at the periphery of the eyewear) can be challenging, and existing lenses surrender a significant percentage of the field of view to these components. However, maximizing a field of view may be critical for the user—such as, for example, when participating in sporting events or driving, where the limited field of view caused by such electrical components may result in performance deficiencies or safety hazards.

SUMMARY

Embodiments disclosed herein are directed to eyewear (e.g., goggles, eye glasses, sun glasses, helmet shields, helmet visors, etc.) that incorporates one or more laminated lenses having electrochromic and/or heating functional layers while maximizing a wearer's field of view. Improved field of view can be accomplished by reducing the bezel size of the laminated lens. For example, the bezel's non-transparent footprint may be reduced while maintaining the functionality of the laminated lens.

In an example embodiment using a goggle form factor, the laminated lens can be fitted into a frame that includes outer and inner sub-frames. An adhesive, such as epoxy glue, is applied at the perimeter of the inner sub-frame before the laminated lens is inserted in place, and the outer sub-frame is snapped onto the inner sub-frame and lens. As a result, the sub-frame can encapsulate the edge of the laminated lens as well as protect the necessary electronic components of the functional layers of the laminated lens. The combination of mechanical and chemical bonding provides additional robustness to the sub-frame. According to some embodiments, the lens frame can include components that allow a wearer to control the electrically-powered functional layers of the laminated lens. By way of example and not limitation, such components can include a control logic unit, a control circuit unit, one or more sensors, and a user interface element that can be used by the wearer to activate or deactivate the electrically-powered components (functional layers) of the laminate lens.

In some examples, the laminated lens can include two lens elements bonded together with an adhesive electrolyte layer. In some embodiments, the two lens elements can include one or more similar, or different, functional layers.

A first lens element of an electrochromic laminated lens can include at least (i) a polymer layer configured to provide structural support to the first lens element (e.g., stiffen the first lens element), (ii) an electrically conductive layer over the polymer layer configured to conduct electric current, and (iii) an electrochromic layer over the electrically conductive layer configured to provide electrochromic functionality to the laminated lens. The electrically conductive layer can provide a heating functionality to the laminated lens. In an embodiment where electrochromic functionality is not desired, the electrochromic layer is not present in the first lens element.

In some examples, the polymer layer can include polyethylene terephthalate (PET) or polycarbonate, and the conductive layer can be a transparent conductor such as indium-tin-oxide (ITO), fluorine doped tin oxide (FTO), indium gallium zinc oxide (IGZO), or doped zinc oxide. The electrochromic layer can include a dichroic dye guest-host layer configured to provide variable light attenuation when voltage is applied to the electrochromic layers via the busbar from an external power supply. Further, the busbar can include a conductive busbar made of silver, copper, gold, aluminum, or a highly conductive metal or alloy.

A second lens element of the laminated lens can include at least an anti-fog layer over a first surface of a polymer layer. The anti-fog layer is configured to resist accumulation of condensate, and the polymer layer is configured to provide structural support to the second lens element (e.g., stiffen the second lens element). The anti-fog layer can be made of cellulose acetate propionate (CAP) and may or may not be transparent to ultraviolet (UV) radiation. An electrically conductive layer is disposed on a second surface of the polymer layer, where the second surface is opposite to the first surface. The electrically conductive layer is configured to conduct electric current and may provide a heating functionality to the laminated lens. The second lens element further includes an electrochromic layer disposed over the conductive layer. The electrochromic layer is configured to provide electrochromic functionality to the laminated lens. In an embodiment where electrochromic functionality is not desired, the electrochromic layer is not present in the second lens element. In some embodiments, the anti-fog layer is located on a surface of the polymer layer opposite the electrically conductive layer on the first lens element instead of the second lens element.

In some embodiments, an adhesive electrolyte layer can be used to bond the first and the second lens components together, so that the electrochromic layers of the first and the second lens elements (or the electrically conductive elements, if electrochromic layers are not present) are facing each other. By way of example and not limitation, the adhesive electrolyte layer can be an adhesion layer made of an electrolyte that hardens (e.g., cures) when exposed to UV radiation.

In some embodiments, a busbar is disposed on each of the first and second lens elements, between a portion of the electrically conductive layer and a portion of the electrochromic layer (or between a portion of the electrically conductive layer and the adhesive electrolyte layer if the electrochromic layers are not present). The busbar can provide electrical connections to the electrically conductive layer and the electrochromic layer, if present. An busbar can be, for example, a conductive busbar made of silver, copper, gold, aluminum, or a highly conductive metal or alloy.

In some embodiments, the first lens element of the laminated lens also includes functional layers disposed over portions of the electrochromic layer of the first lens element, such that when the first and second lens elements are bonded together, the functional layer is substantially aligned with respect to the busbars. The functional layers can include, for example, components needed for electrochromic and/or heating functionality. In some embodiments, the functional layers and the busbars are opaque; therefore, their respective surface areas and relative position to each other determine the size of the bezel. By stacking the functional layers and the busbars at the peripheral edge of the lens elements, the bezel size can be minimized, and the wearer's field of view can be maximized as compared to existing lenses.

If the laminated lens is to be used in a rimless configuration, an edge seal can be added to secure and protect the laminated lens layers from the environment. If the laminated lens is to be placed in an orbital frame, then such an edge seal can be left off, further increasing the field of view of the wearer. In some embodiments, the width of the busbars and functional layers are such that they are completely covered by a frame edge when the laminated lens is inserted into a frame. The frame edge mechanically supports the laminated lens, and itself protects the lens layers from the environment. Further, an adhesive can be used to seal the peripheral edge of the laminated lens to the frame. Such an adhesive also acts to seal the layers of the laminated lens, further protecting the lens from the environment without requiring the use of a separate edge seal specific to the lens itself.

In some embodiments, such a frame assembly for securing an electrically conductive lens includes an inner sub-frame housing, an outer sub-frame housing that mates to the inner sub-frame housing, and the electrically conductive lens, wherein a peripheral edge of the lens is positioned between the inner and outer sub-frame housings. In some embodiments, the inner sub-frame housing has a protrusion positioned above a first groove, wherein each of the protrusion and the first groove are formed on a peripheral edge of the inner sub-frame housing. In some embodiments, the outer sub-frame housing has a second groove on a peripheral edge of the outer sub-frame housing having a shape that is complementary to the inner sub-frame housing protrusion. In this way, the outer sub-frame housing is configured to fasten onto the inner sub-frame housing, with the protrusion of the inner sub-frame housing fitting into the second groove on the outer sub-frame housing. A space is formed between the surface of the outer sub-frame housing and the first groove of the inner sub-frame housing. In some embodiments, the peripheral edge of the electrically conductive lens fits within this space. In some embodiments, a bonding agent, such as epoxy glue, is disposed into this space such that it surrounds the peripheral edge of the lens and bonds the lens to the frame.

In some embodiments using a solid frame, a bonding agent applied between the peripheral edge of the electrically conductive lens and the inner surface of the frame seals the layers of the laminated lens, and adheres the lens within the frame.

Further embodiments, features, and advantages of the invention, as well as the structure and operation of the various embodiments of the invention, are described in detail below with reference to the accompanying drawings.

BRIEF DESCRIPTION OF THE DRAWINGS

Embodiments of the present invention are described with reference to the accompanying drawings. In the drawings, like reference numbers indicate identical or functionally similar elements. Additionally, the left most digit(s) of a reference number identifies the drawing in which the reference number first appears.

It is noted that various features may not be drawn to scale. In fact, the dimensions of the various features can be arbitrarily increased or reduced for clarity of illustration and discussion.

DETAILED DESCRIPTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures and techniques have been shown in detail in order not to obscure an understanding of this description.

Figure 9:
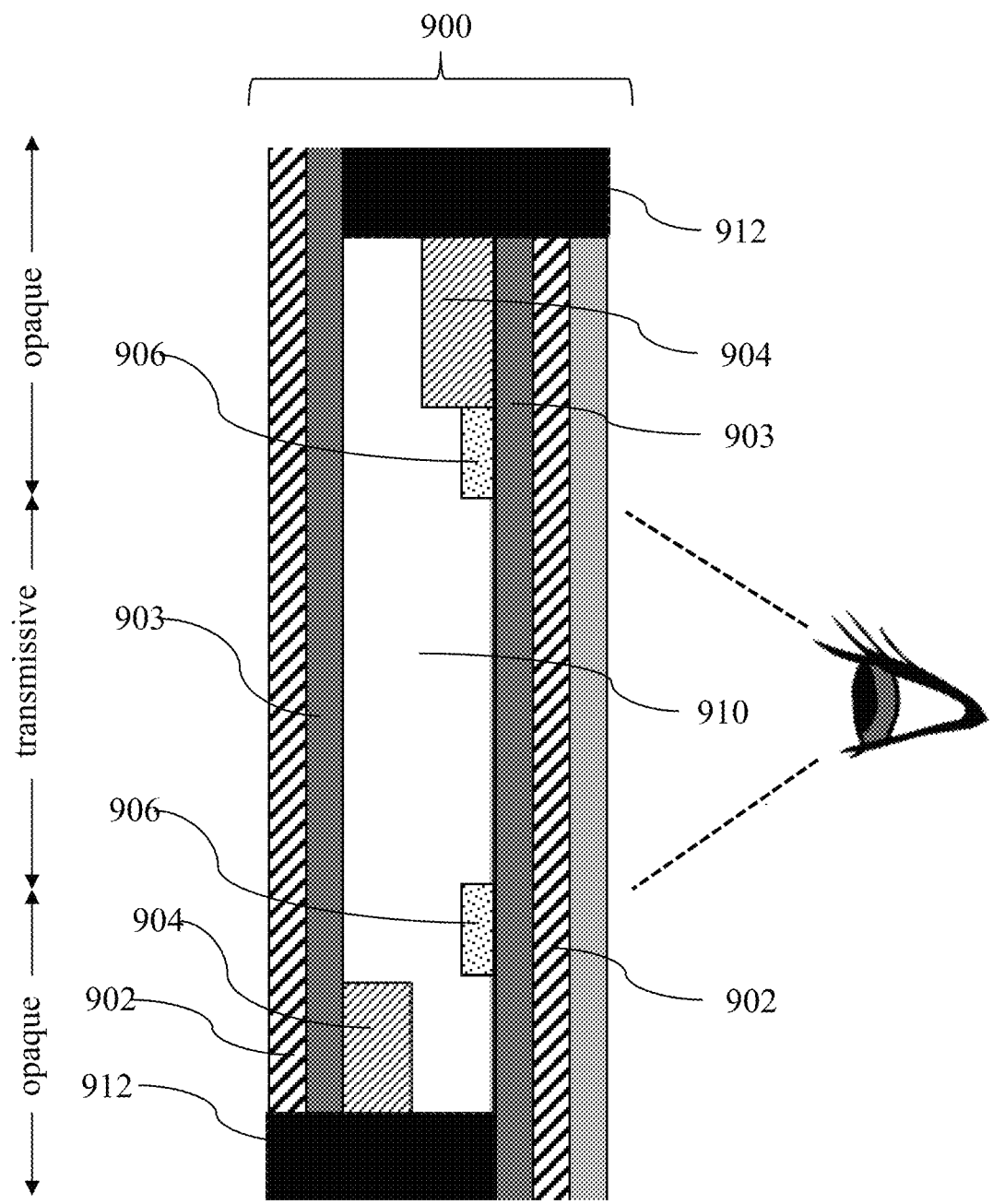
FIG. 9 is a cross-sectional view of an existing laminated lens having a limited field of view.

Currently, the various layers in an electrically-conductive lens are typically secured and sealed using one or more edge seals. FIG. 9 illustrates an example of such a typical lens. The lens 900 of FIG. 9 contains two electrically conductive layers 902 and two electrochromic layers 903. Electrically conductive layers 902 receive electric current through one or more busbars 904, which act as electrical connection points between each conductive layer 902 and an external power supply (not shown). Functional layers 906 are placed adjacent one of the electrochromic layers 903, next to an electrolyte 910. The lens layers are secured and sealed from the environment by edge seals 912.

In FIG. 9, because each of the edge seals 912, busbars 904, and functional layers 906 are often opaque, a wearer's field of view (the light transmissive portion of the lens) is limited to to the space between functional layers 906. Such a limited field of view is unsatisfactory to wearers, particularly those participating in sporting events where a wide field of view is needed for performance and/or safety.

Figure 1:
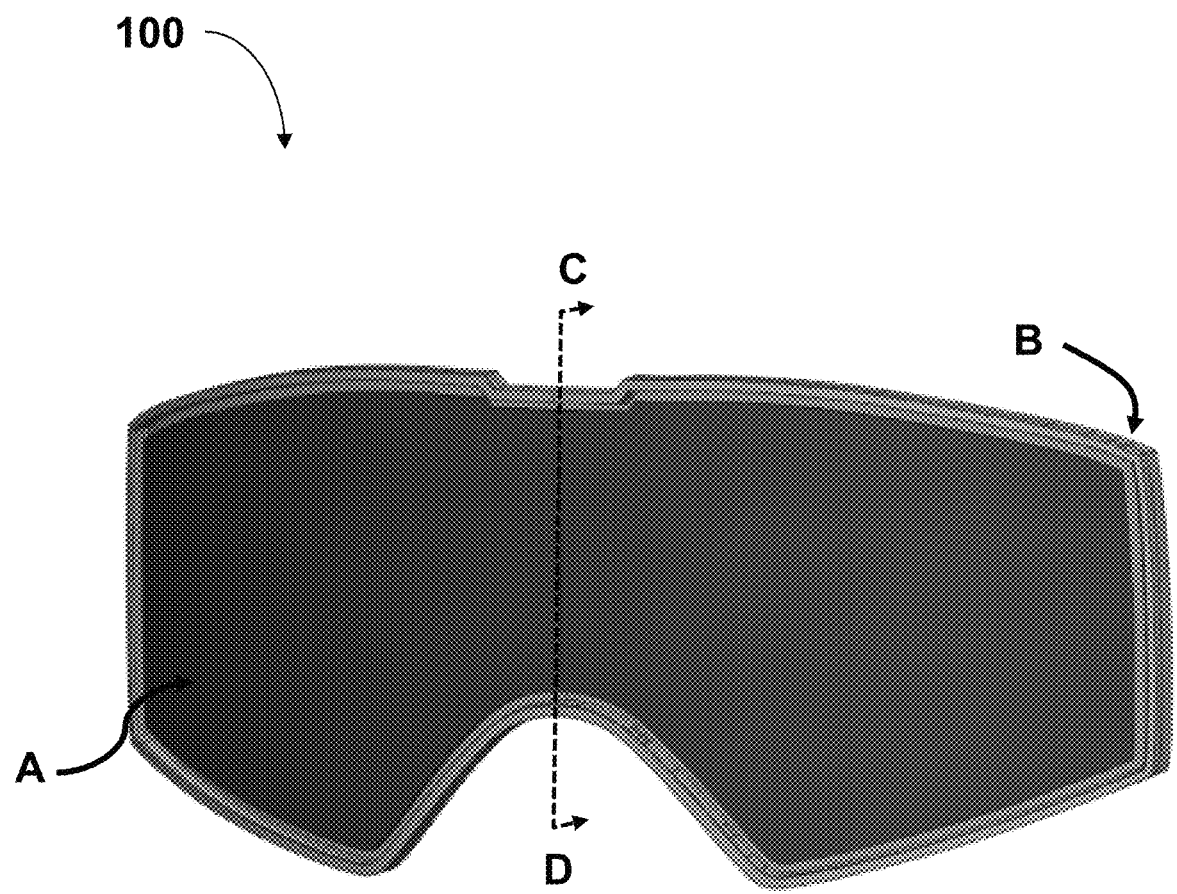
FIG. 1 is a front view of an exemplary laminated lens with electrochromic and/or heating functional layers, according to some embodiments.

FIG. 1 is a front view of an example laminated lens 100 having a reduced bezel size, according to some embodiments of the present invention. The busbar and functional layers in lens 100 have been rearranged with respect to lens 900 of FIG. 9. The inventors additionally recognized that, in embodiments, an edge seal, such as edge seal 912 in FIG. 9, can be eliminated when an adhesive is used to seal a lens within an orbital frame. The frame and its corresponding seal render any additional lens-based edge seal redundant. By stacking the busbar and functional layers, and moving the busbar and functional layers to the periphery of the lens that would otherwise have been occupied by an edge seal, the lens' field of view can be maximized.

In an embodiment, and as will be described further with respect to FIG. 2, laminated lens 100 is formed from two individual lens elements bonded together via an adhesive electrolyte layer. Each of the lens elements can include one or more electrically-powered components, such as, for example, electrochromic layers and/or heating layers. Further, each of the lens elements—as described in detail more below—can include additional layers, such as one or more anti-fog layers, optical filters, antireflective coatings (ARC), and the like. Mechanical support for each lens element of laminated lens 100 is provided through a polymer layer that functions as a substrate on which the aforementioned layers can be formed.

By way of example and not limitation, laminated lens 100 can be fitted into a variety of eyewear frames including, but not limited to, general-purpose eyewear, special-purpose eyewear, sunglasses, driving glasses, sporting glasses, goggles, helmets, visors, shields, indoor eyewear, outdoor eyewear, vision-correcting eyewear, contrast-enhancing eyewear, eyewear designed for another purpose, or eyewear designed for a combination of purposes.

Laminated lens 100 can be a corrective lens or a non-corrective lens. Laminated lens 100 can be made of any of a variety of optical materials including glass and/or plastics, such as, for example, acrylics or polycarbonates, as described in more detail below. Laminated lens 100 can have various shapes. For example, laminated lens 100 can be flat or have one or more axes of curvature. Further, a surface of laminated lens 100 can be cylindrical, parabolic, spherical, flat, or elliptical, or any other shape such as a meniscus or catenoid. When worn, laminated lens 100 can extend across the wearer's normal straight ahead line of sight, and can extend substantially across the wearer's peripheral zones of vision. As used herein, the wearer's normal line of sight shall refer to a line projecting straight ahead of the wearer's eye, with substantially no angular deviation in either the vertical or horizontal planes. In some embodiments, laminated lens 100 extends across a portion of the wearer's normal straight ahead line of sight.

In an embodiment, the outside surface of laminated lens 100 can conform to a shape having a smooth, continuous surface having a constant horizontal radius (sphere or cylinder) or progressive curve (ellipse, toroid or ovoid), or other aspheric shape in either the horizontal or vertical planes. The geometric shape of some other embodiments can be generally cylindrical, having curvature in one axis and no curvature in a second axis. Laminated lens 100 can, in embodiments, have a curvature in one or more dimensions. For example, laminated lens 100 can be curved along a horizontal axis. As another example, laminated lens 100 can be characterized in a horizontal plane by a generally arcuate shape, extending from a medial edge throughout at least a portion of the wearer's range of vision to a lateral edge. In some embodiments, laminated lens 100 is substantially linear (not curved) along a vertical axis. In some embodiments, laminated lens 100 has a first radius of curvature in one region, a second radius of curvature in a second region, and transition sites disposed on either side of the first and second regions. The transition sites can be a coincidence point along laminated lens 100 where the radius of curvature of laminated lens 100 transitions from the first to the second radius of curvature, and vice versa. In some embodiments, laminated lens 100 can have a third radius of curvature in a parallel direction, a perpendicular direction, or some other direction. In some embodiments, laminated lens 100 can lie on a common circle. The right and left lenses in a high-wrap eyeglass can be canted such that the medial edge of each lens will fall outside of the common circle and the lateral edges will fall inside of the common circle. In some embodiments, providing curvature in laminated lens 100 can result in various advantageous optical qualities for the wearer, including reducing the prismatic shift of light rays passing through laminated lens 100, and providing an optical correction.

A variety of lens configurations in both horizontal and vertical planes are possible. For example, either the outer or the inner or both surfaces of laminated lens 100 of some embodiments can generally conform to a spherical shape or to a right circular cylinder. Alternatively, either the outer or the inner or both surfaces of the lens may conform to a frusta-conical shape, a toroid, an elliptic cylinder, an ellipsoid, an ellipsoid of revolution, other aspheres or any of a number of other three dimensional shapes. Regardless of the particular vertical or horizontal curvature of one surface, however, the other surface may be chosen such as to minimize one or more of power, prism, and astigmatism of the lens in the mounted and as-worn orientation.

In some embodiments, the eyewear incorporates canted laminated lens 100 mounted in a position rotated laterally relative to conventional centrally oriented dual lens mountings. A canted lens may be conceived as having an orientation, relative to the wearer's head, which would be achieved by starting with conventional dual lens eyewear having centrally oriented lenses and bending the frame inwardly at the temples to wrap around the side of the head. When the eyewear is worn, a lateral edge of laminated lens 100 wraps significantly around and comes in close proximity to the wearer's temple to provide significant lateral eye coverage and improved field of view.

A degree of wrap may be desirable for aesthetic styling reasons, for lateral protection of the eyes from flying debris, or for interception of peripheral light. Wrap may be attained by utilizing lenses of tight horizontal curvature (high base), such as cylindrical or spherical lenses, and/or by mounting each lens in a position which is canted laterally and rearwardly relative to centrally oriented dual lenses. Similarly, a high degree of rake or vertical tilting may be desirable for aesthetic reasons and for intercepting light, wind, dust or other debris from below the wearer's eyes. The term "rake" describes the condition of a lens, in the as-worn orientation, for which the normal line of sight intercepts a vertical tangent to the lens at a non-perpendicular angle.

In some embodiments, laminated lens 100 can be finished, as opposed to semi-finished, with laminated lens 100 being contoured to modify the focal power. In some embodiments, laminated lens 100 can be semi-finished so that laminated lens 100 can be capable of being machined, at some time following manufacture, to modify their focal power. In some embodiments, laminated lens 100 can have optical power and can be prescription lenses configured to correct for near-sighted or far-sighted vision. Laminated lens 100 can have cylindrical characteristics to correct for astigmatism.

Laminated lens 100 can be shaped for insertion into a particular eyewear frame. Various materials can be utilized in the fabrication of the eyewear frame including metals, composites, or molded thermoplastic materials. The frame of the eyewear can be fabricated according to various configurations and designs. In some embodiments, the frame can be configured to retain a unitary lens that is placed in front of both eyes when the eyewear is worn.

In the example of FIG. 1, laminated lens 100 is designed for a goggle frame. As shown in FIG. 1, laminated lens 100 is positioned relative to the wearer when worn so that side A is proximal to the wearer's face, and side B—which is opposite to side A—is distal to the wearer's face.

In some embodiments, laminated lens 100 is fitted to a type of eyewear that includes a power source (e.g., a battery), one or more electrical contacts, and one or more conductive elements (e.g., wires) that can provide power to one or more electrically-powered components of laminated lens 100. In some embodiments, the eyewear can include a control logic unit that is coupled to a sensor and can automatic adjust the power delivery to the one or more electrically-powered components of laminated lens 100. By way of example and not limitation, the sensor can be a temperature sensor, a humidity sensor, a light sensor, and/or other types of sensors that are capable of detecting a change of a respective metric in the surrounding ambient and provide a signal through a control circuit to the logic unit. The eyewear may also include a user interface element that is integrated to the frame of the eyewear and/or laminated lens 100. By way of example and not limitation, the user interface element may allow the user to activate and deactivate the electrically-powered components of laminate lens 100. The user interface element can be, for example, a switch, a button, a toggle switch, a touch-interface element, a knob, or another mechanical and/or electrical feature.

For example purposes, laminated lens 100 will be described in the context of a lens fitted to a goggle frame. Based on the disclosure herein, other types of eyewear, as discussed above, can be used. These types of eyewear are within the spirit and scope of this disclosure.

Figure 2:
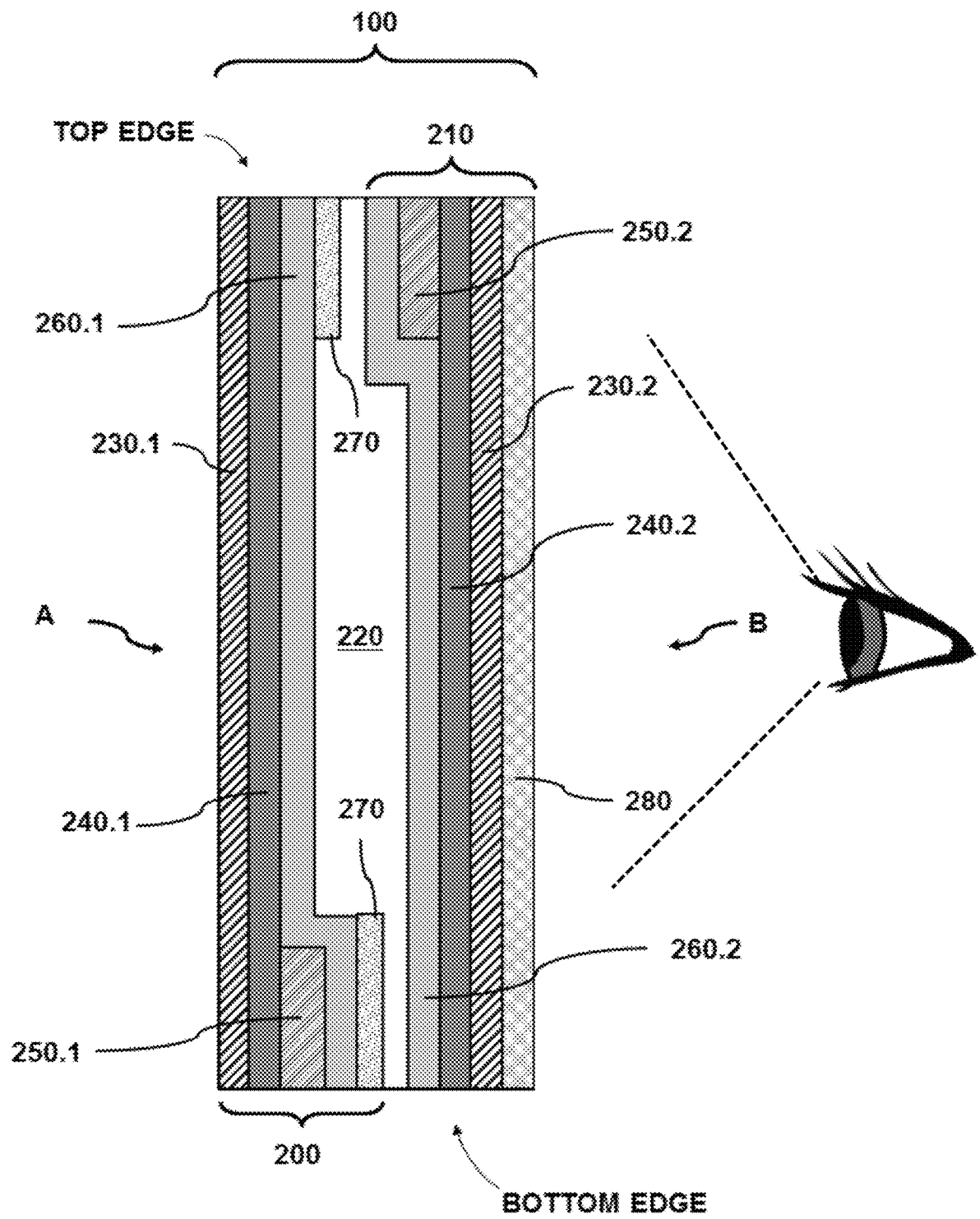
FIGS. 2 and 3 are cross-sectional views of an exemplary laminated lens with electrochromic and heating functional layers and reduced bezel size, according to some embodiments.

FIG. 2 is a cross-sectional view of laminated lens 100 across line C-D, shown in FIG. 1. As discussed above, laminated lens 100 can be made of a first lens element 200 and a second lens element 210. As shown in FIG. 2, second lens element 210 is located on side B of laminated lens 100, and therefore closer to the wearer when laminated lens 100 is worn. First lens element 200 is located on side A of laminated lens 200 and further away from the wearer when laminated lens 100 is worn. Lens elements 200 and 210 are bonded together via adhesion layer 220. In some embodiments, adhesion layer 220 can be made of an electrolyte that hardens (e.g., cures) when exposed to UV radiation. First and second elements 200 and 210 can include similar layers as described in more detail below.

Referring to FIG. 2, first lens element 200 includes a polymer layer 230.1. According to some embodiments, polymer layer 230.1 functions as a substrate on which subsequent functional layers of first lens element 200 can be formed. Further, polymer layer 230.1 forms side A of laminated lens 100. By way of example and not limitation, polymer layer 230.1 can be made of polycarbonate (PC), nylon, polyurethane, polyethylene, polyethylene terephthalate (PET), polyimide, acrylic, MYLAR®, clear glass, doped glass, or filtered glass. Additionally, polymer layer 230.1 can have different shapes and sizes depending on the application and size/shape of the frame. For example, polymer layer 230.1 can have a convex shape. The size and the shape of polymer layer 230.1 may define the shape of first lens element 200. The inner and/or outer surfaces of the polymer layer 230.1 can be tinted. In some embodiments, the inner and/or outer surfaces of the polymer layer 230.1 can be clear. In various embodiments, the outer surface of the polymer layer 230.1 can be configured to receive ambient incident light.

An electrically conductive layer 240.1 (thereafter conductive layer 240.1) can be formed on polymer layer 230.1, according to some embodiments. In an embodiment, conductive layer 240.1 is transparent (e.g., have high transmittance) to visible and UV light. For this reason, conductive layer 240.1 can be formed from a transparent and electrically conductive material, such as indium tin oxide (ITO), fluorine doped tin oxide (FTO), doped zinc oxide, or indium gallium zinc oxide (IGZO). In some embodiments, conductive layer 240.1 can operate as a resistive heating element to heat side A of laminate lens 100. Heating, for example, can prevent accumulation of condensates on laminate lens 100. Conductive layer 240.1 can receive electric current through busbar 250.1 which acts as an electrical connection point between conductive layer 240.1 and an external power supply (not shown). In some embodiments, busbar 250.1 extends to wiring that is connected to an external power supply, such as a rechargeable or replaceable battery. By way of example and not limitation, the battery (not shown) can be disposed in the frame of the eyewear.

Since busbar 250.1 is opaque to visible or UV light, its size and position across first lens element 200 can affect the transparent area of the lens and subsequently the user's field of view. Therefore, the placement and size of busbar 250.1 can determine the frame's bezel size. According to some embodiments, and as shown in FIG. 2, busbar 250.1 can be formed over a portion of conductive layer 240.1 at or near the bottom edge of laminated lens 100 so that the bezel size can be controlled. Busbar 250.1 can be made from silver, copper, gold, aluminum, or another highly conductive metal or alloy at a thickness between, for example and without limitation, about 15 µm and about 30 µm. Further, conductive layer 240.1 can be formed at a thickness from about 10 µm to about 100 µm.

Referring to FIG. 2, an electrochromic (EC) layer 260.1 can be formed over busbar 250.1 and conductive layer 240.1. Electrochromic layer 260.1 has the ability to change its optical properties (e.g., optical transmission, absorption, reflectance, and/or emittance) in a continual but reversible manner under the application of a voltage from an external power supply. Busbar 250.1 can be electrically coupled to electrochromic layer 260.1. Further, an external power supply (not shown in FIG. 2) can be attached to the eyewear and be electrically coupled to busbar 250.1. A user interface element configured to change an amount of power provided to busbar 250.1 (e.g., by the power supply) can be disposed on the eyewear. Consequently, electrochromic layer 260.1 can provide variable light attenuation depending on the amount of power provided by the power supply. By way of example and not limitation, the user interface element can be a touch-sensitive element, located on the frame of the eyewear where laminated lens 100 is attached. According to some embodiments, electrochromic layer 260.1 can include any electrochromic material as known to one of skill in the art, such as an electrochromic dye, a dichroic dye guest-host layer, etc.

Second lens element 210 can include similar layers with first lens element 200. For example, and referring to FIG. 2, second lens element 210 can include polymer layer 230.2, conductive layer 240.2, busbar 250.2, and electrochromic layer 260.2 in a similar or different arrangement to their counterpart layers in first lens element 200. Further the layers of second lens element 210 may function and perform similarly and/or complementary to the layers of first lens element 200.

According to some embodiments, two functional layers 270 can be formed over portions of electrochromic layer 260.1 in first lens element 200 as shown in FIG. 2. Functional layers 270 may be transparent or opaque. If opaque, use of functional layers 270 in a lateral (i.e., side-by-side) configuration increases the opaque area of laminated lens 100 and reduces the available field of view. According to embodiments of the invention, however, functional layers 270 can be positioned at or near the top and bottom edges of laminated lens 100, as shown in FIG. 2. Because functional layers 270 are stacked in line with busbars 250.1 and 250.2, functional layers 270 do not impact the user's field of view, increasing the field of view as compared to current lenses.

In addition to the aforementioned layers, second lens element 210 can also include a transparent (e.g., to visible light) anti-fog layer 280 formed on polymer layer 230.2, and opposite to electrically conductive layer 240.2. In an embodiment, anti-fog layer 280 is configured to resist accumulation of a condensate; such as for example, evaporated sweat from the face of the user. In some embodiments, the anti-fog layer can be made of cellulose acetate propionate (CAP) at a thickness of about 500 µm and may or may not be transparent to ultraviolet (UV) radiation. Anti-fog layer 280 may be particularly useful, for example, in goggle lens embodiments or other embodiments where air does not freely flow between the wearer and the lens.

In some embodiments, anti-fog layer 280 can be disposed in first lens element 200 instead of second lens element 210. Further, first and second lens elements 200 and 210 can include additional layers not shown in FIG. 2. Such layers include but are not limited to any combination of chroma enhancement layers, color filters, anti-reflective coatings, hard coats, flash mirror layers, anti-static layers, liquid containing layer(s), color enhancement layers, contrast enhancement layers, trichoic filters, glass layers, and/or hybrid glass-plastic layers, and the like. Example additional layers are described in U.S. Pat. No. 8,770,749 and U.S. patent application Ser. No. 15/679,872, which is/are incorporated by reference herein.

As discussed above, functional layers 270 and busbars 250.1 and 250.2 may be non-transparent elements, such that their respective surface areas and relative position can affect the user's field of view. In some embodiments, as illustrated in FIG. 2, functional layers 270 can be substantially aligned to each of the busbars 250.1 and 250.2 so that the opaque area of laminated lens 100 is minimized. Reduction of the non-transparent area of laminated lens 100 can subsequently reduce the frame's bezel size and improve the wearer's field of view. For example, busbars 250.1 and 250.2 and functional layers 270 may be sized to be hidden within a standard lens frame, such that they do not affect the lens' field of view any more than the frame. However, the relative position of functional layers 270 with respect to busbars 250 is not limited to the example of FIG. 2 and additional arrangements are possible.

In an embodiment, an electrically conductive lens can have heating capability without electrochromic functionality. In such an embodiment, the lens would include the stacked busbar and any other opaque functional lenses as illustrated with respect to FIG. 2. Additionally, such a lens would include conductive layers 240.1 and 240.2, but would not include electrochromic layers 260.1 or 260.2.

Lens 100 can be modular, such that it can incorporated into rimless (or faceless), semi-rimless, and full orbital eyewear. Further, lens 100 can be incorporated into dual-lens eyewear, or as a single lens or shield that covers both eyes of a wearer. When lens 100 is used in a rimless or semi-rimless configuration, an edge seal can be added across the top and bottom edges of lens 100. In this way, the lens layers are protected from the environment. For example, the edge seal can act as a barrier against water, moisture or dust, when not otherwise protected by a full orbital frame. This may be particularly useful when lens 100 is incorporated into a rimless or semi-orbital frame, or when the lens is a modular, removable lens that can be handled separately from any lens frame (such as, for example, a swappable goggle lens). In a rimless configuration, lens 100 can be mounted directly to outriggers, a strap, or earstems. Such mounting can engage directly with (e.g., couple to) the outside edge of lens 100. Alternatively, a mounting may break through the edge seal such that the mounting is inserted into lens 100 itself. In such an embodiment, an additional seal around the intersection of the mounting and the lens can be applied to protect the interior of the lens from moisture, gas, or dust.

When lens 100 is incorporated into a full orbital frame, a separate edge seal may not be needed because the frame itself acts to seal the edges. Further types of lens-frame mountings suitable for use with lens 100 are described in PCT Appl. No. PCT/US2015/060103 and U.S. patent application Ser. No. 15/679,872, which are incorporated by reference herein in their entireties.

Figure 3:
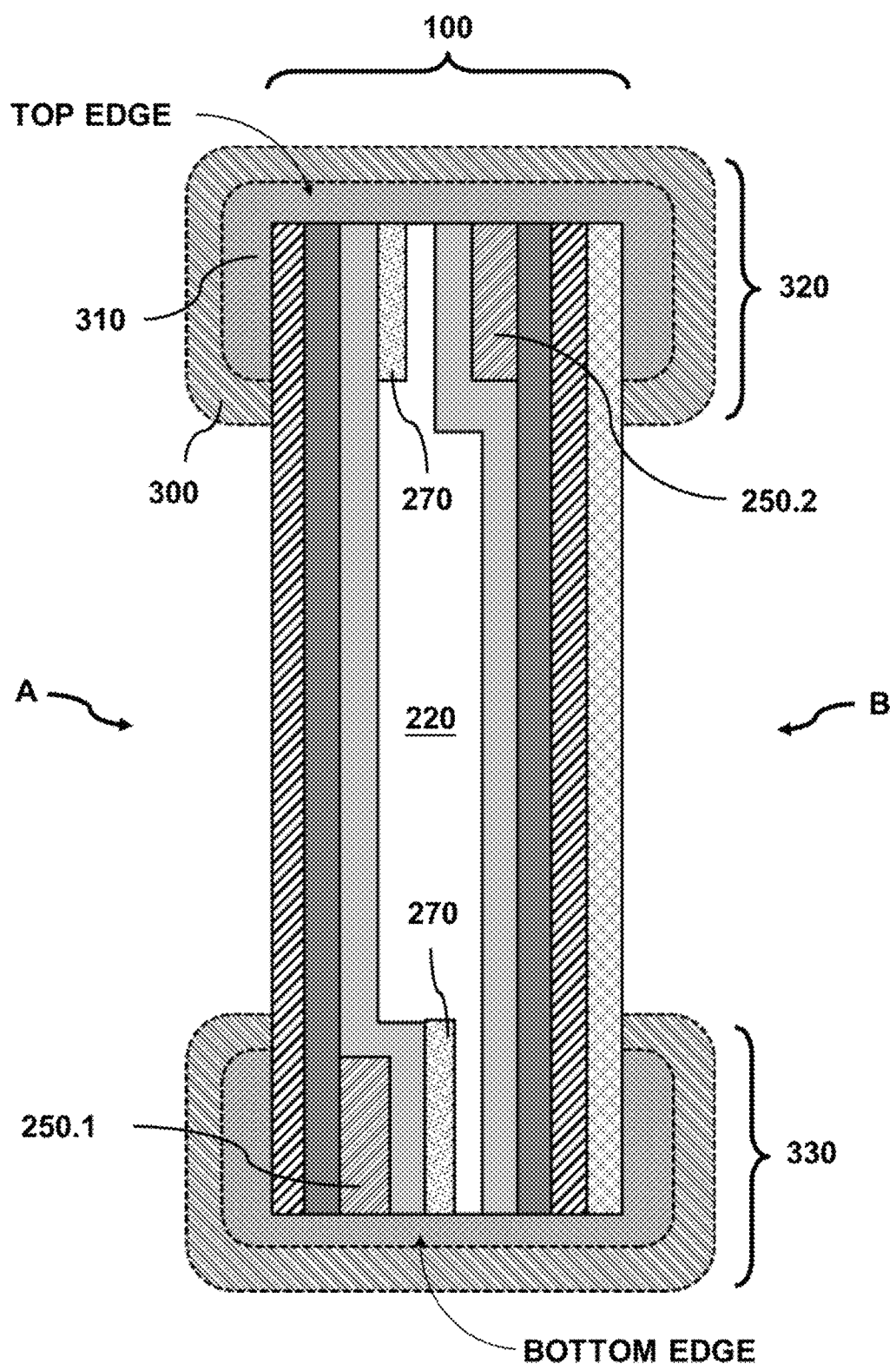

FIG. 3 illustrates laminated lens 100 of FIG. 2 attached to frame 300 with an edge seal/barrier adhesive layer 310. In the configuration of FIG. 3, where both functional layers 270 are substantially aligned to busbars 250.1 and 250.2, each of top bezel 320 and bottom bezel 330 are equally sized. For example, bezels 320 and 330 may each be, for example, about 2 mm across. However, in an embodiment, top bezel 320 can be larger than bottom bezel 330. Such a size difference may occur if the metal oxide 270 that is located closer to the top edge of laminated lens 100 is offset with respect to busbar 250.2. By way of example and not limitation, top bezel 320 can be about 4 mm wide and bottom bezel can be about 2 mm wide in such a configuration.

Figure 4:
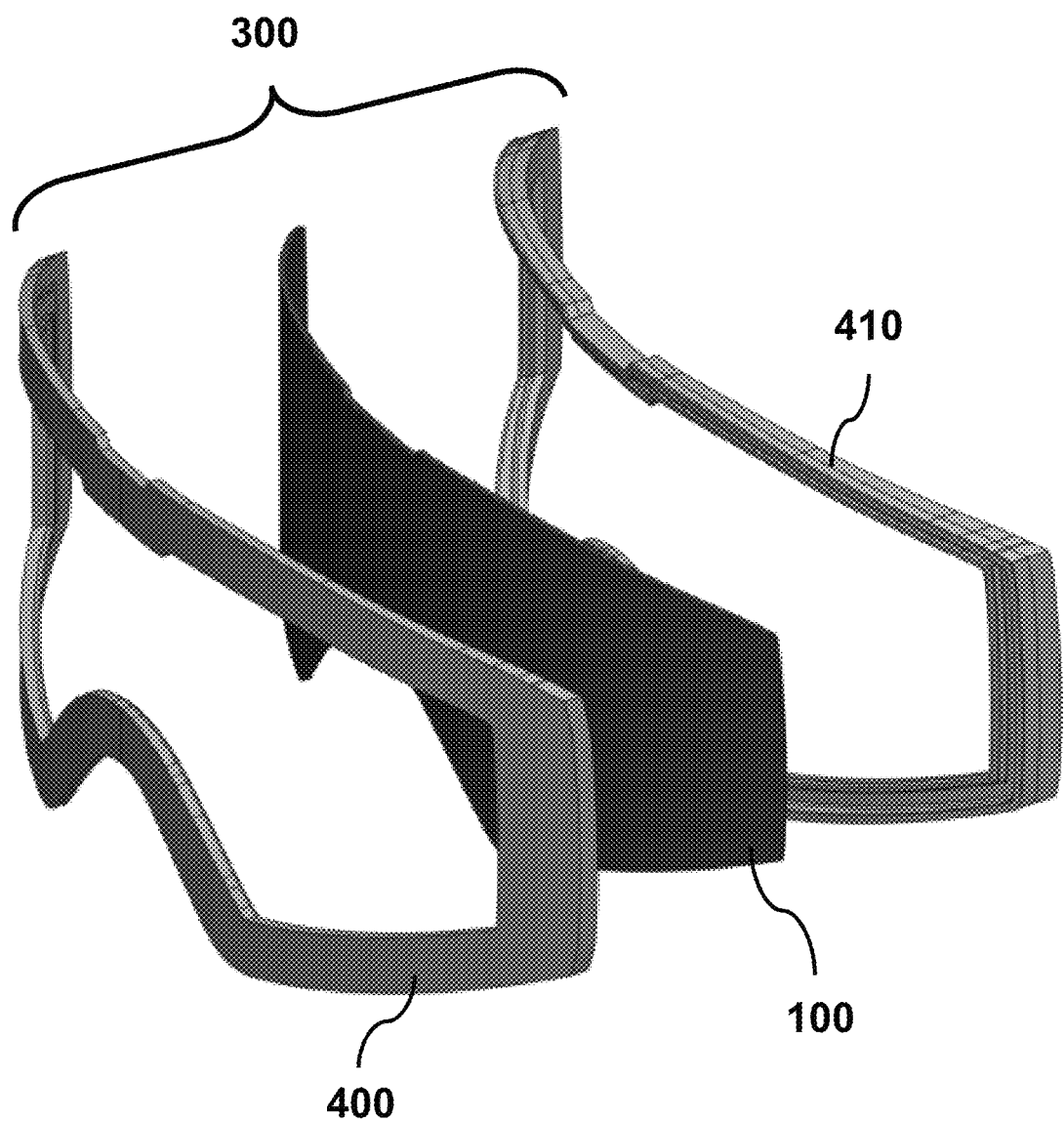
FIG. 4 is an isometric view of a frame assembly, according to some embodiments.

According to some embodiments, frame 300 includes more than one component. For example, FIG. 4 shows frame 300 comprising an outer sub-frame housing 400 and inner sub-frame housing 410 so that when frame 300 is worn, the inner sub-frame housing 410 is proximal to the wearer's face and outer sub-frame housing 400 is distal to the wearer's face. In some embodiments, laminated lens 100 can be securely attached within a space formed between the outer and inner sub-frames. In some embodiments, supporting elements that can hold frame 300 on the wearer's head (e.g., stems, outriggers, or a strap) can be attached to frame 300 either on the outer sub-frame housing 400 or the inner sub-frame housing 410. In cases where there is no frame 300—e.g., laminated lens 100 is rimless—the supporting elements can be attached directly to the edge-sealed laminated lens 100.

Figure 4A:
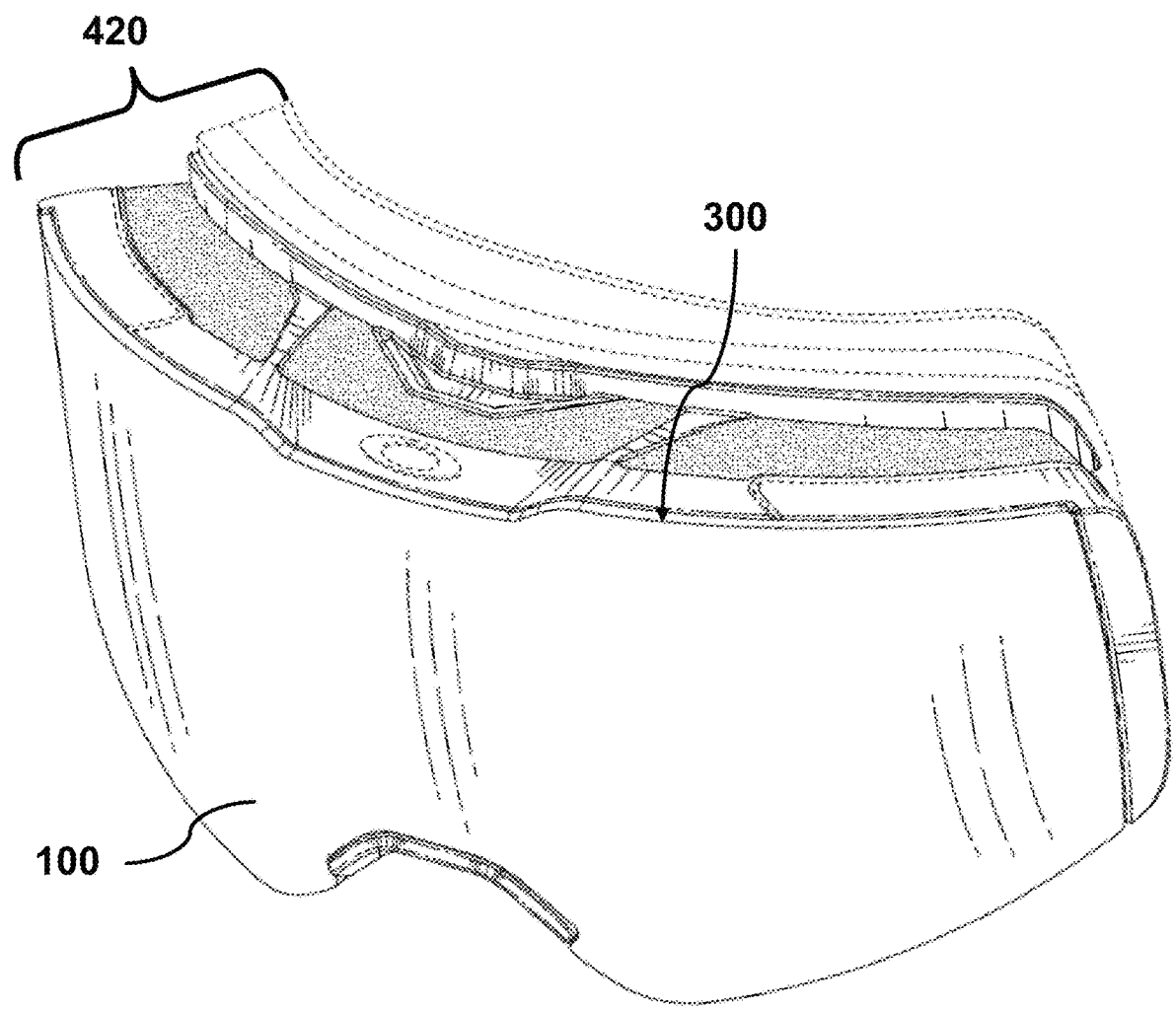
FIGS. 4A, 4C are isometric views of a modular sub-frame assembly on a frame chassis, according to some embodiments.
Figure 4B:
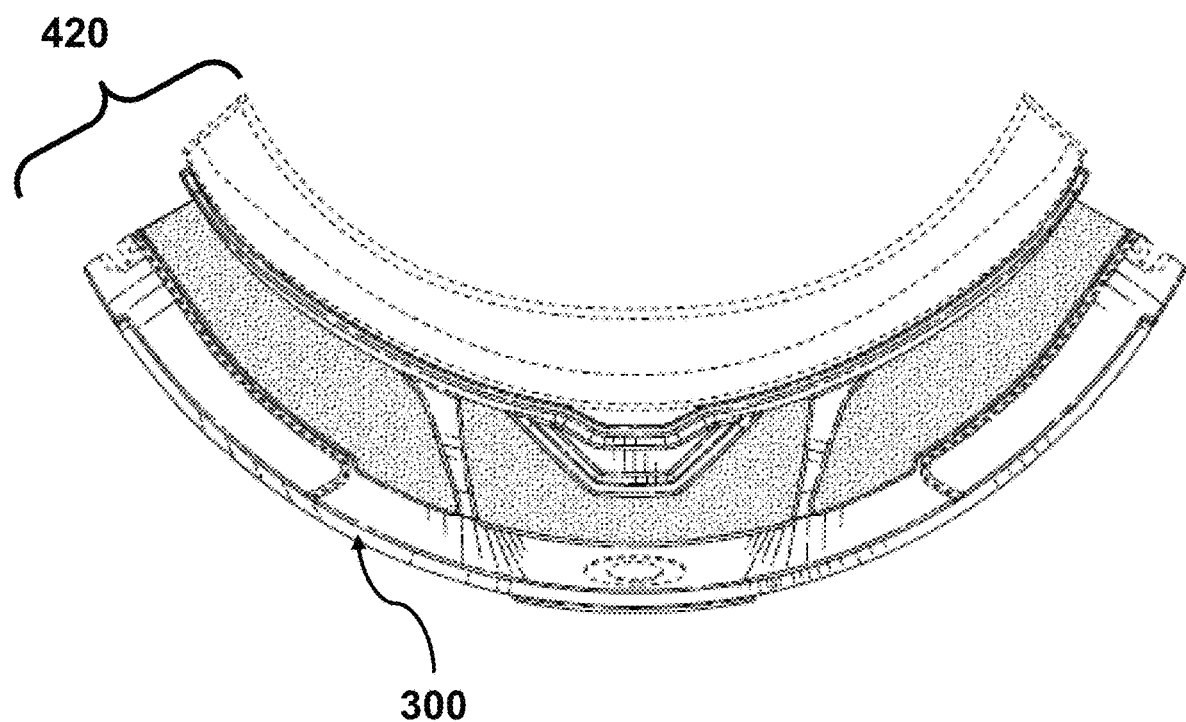
FIG. 4B is a top-view of a modular sub-frame assembly on a frame chassis, according to some embodiments.
Figure 4C:
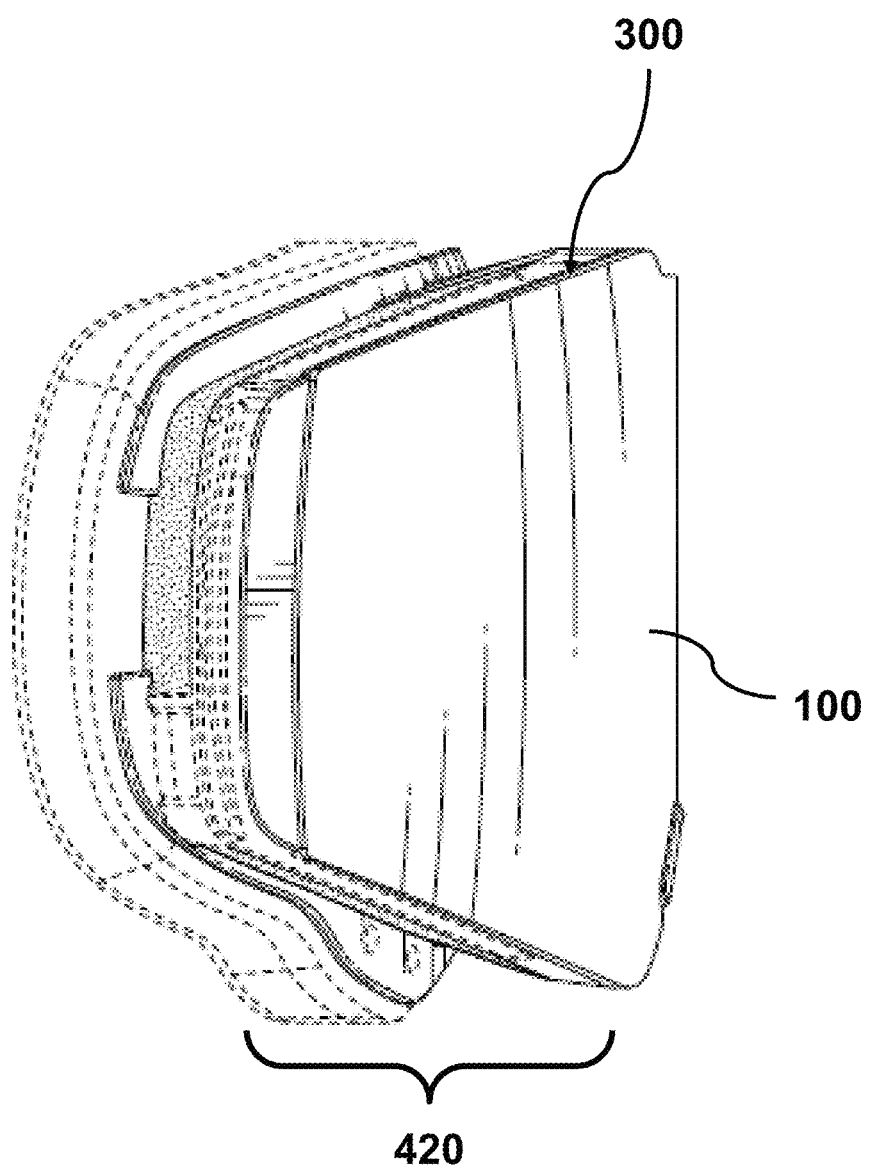

In some embodiments, frame 300 can be a removable modular sub-frame that is attached to a frame "chassis" 420, as shown in FIGS. 4A-4C. By way of example and not limitation, frame chassis 420 can be a goggle chassis, a helmet chassis, a sunglass frame chassis and the like. A wearer can have a frame chassis 420 in which a removable modular sub-frame 300 can be attached from a selection of removable modular sub-frames 300. Each of the removable modular sub-frames 300 can have a laminated lens 100 with different functionality. For instance, a wearer may select a modular sub-frame 300 with a laminated lens 100 that has heating/anti-fog functionality for a winter sport activity and a different modular sub-frame 300 with a laminated lens 100 that has only electrochromic functionality for a different activity.

Figure 4D:
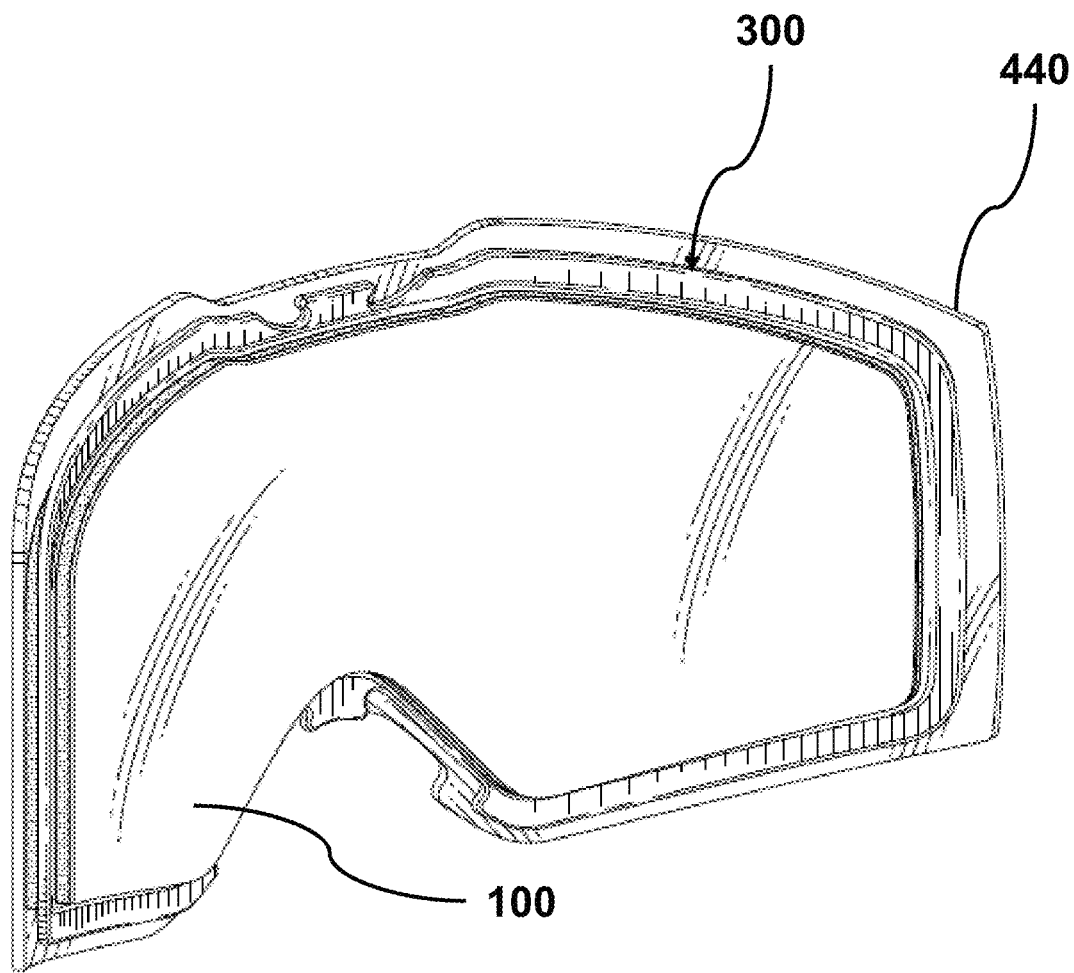
FIGS. 4D and 4E are respective isometric and top views of a dual lens assembly, according to some embodiments.
Figure 4E:
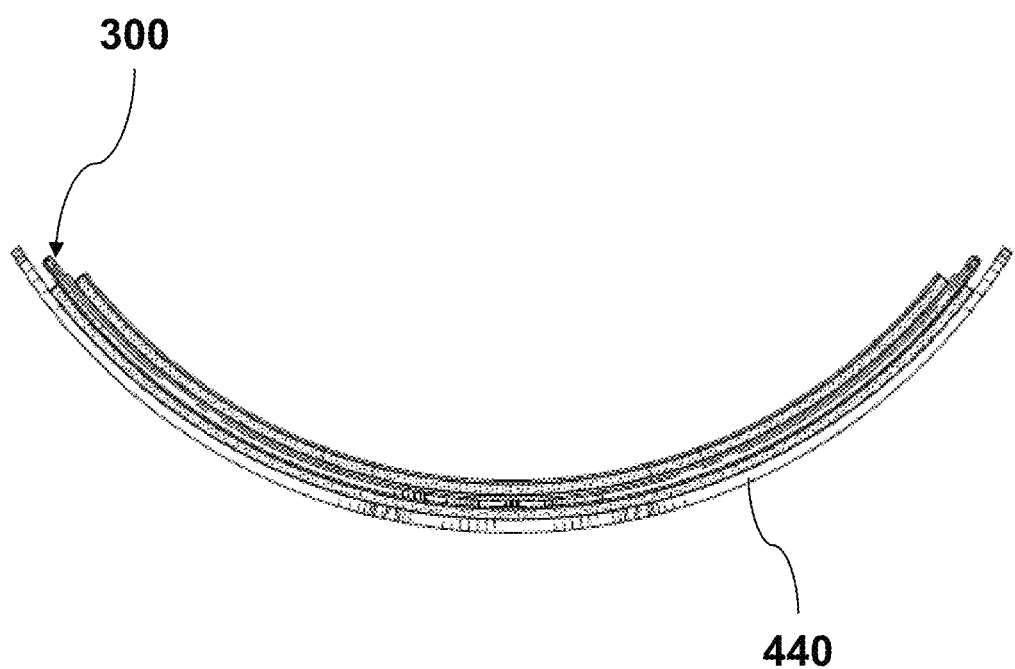

In some embodiments, an additional lens can be fitted in front of frame 300 (or modular sub-frame 300). For example, an additional lens 440, such as a chroma enhancement lens, can be attached in front of frame 300 to form a dual-lens assembly as shown in FIGS. 4D and 4E. The additional lens can have functionalities that are complementary to the functionalities of laminated lens 100.

As discussed above, frame 300 is not limited to goggles and can be a frame for a variety of eyewear, including but not limited to general-purpose eyewear, special-purpose eyewear, sunglasses, driving glasses, sporting glasses, helmets, visors, shields, indoor eyewear, outdoor eyewear, vision-correcting eyewear, contrast-enhancing eyewear, eyewear designed for another purpose, or eyewear designed for a combination of purposes.

As discussed above, frame 300 can include a power source (e.g., a battery), one or more electrical contacts, and one or more conductive elements (e.g., wires) that can provide power to one or more electrically-powered components of laminated lens 100. Further, frame 300 can also include additional components such as a control logic unit, a control circuit unit, one or more sensors, and a user interface element that can be used by the user to activate or deactivate the electrically-powered components of laminate lens 100. By way of example and not limitation, each of the outer or inner sub-frame housings (e.g., 400 and 410) can be configured to include the aforementioned elements. Alternatively, these elements can be shared between the outer and inner sub-frame housings.

Figure 5:
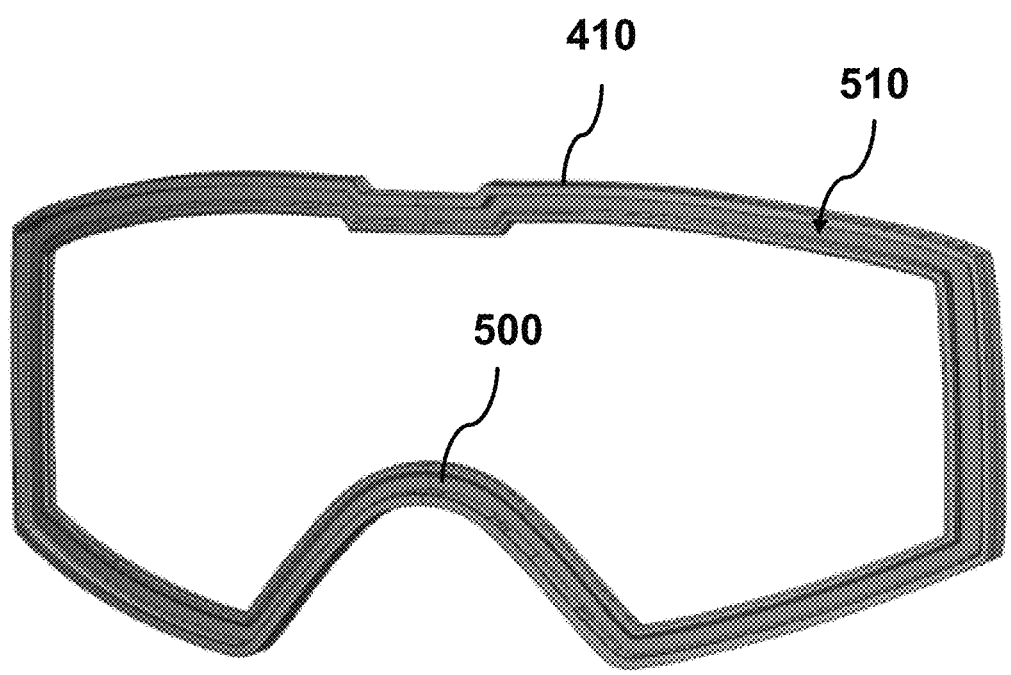
FIG. 5 is an inner sub-frame housing of an exemplary frame assembly, according to some embodiments.

By way of example and not limitation, the assembly of frame 300 can be described with reference to FIGS. 5-7. A glue layer 500 is disposed in a groove 510 located at the perimeter of inner frame 410 as shown in FIG. 5 (see also FIG. 8). Glue layer 500 provides a chemical bond between laminated lens 100 and the sub-frames 400 and 410, sealing the layers of laminated lens 100 from the environment. Further, glue layer 500 may act a shock absorber in an impact incident.

Figure 6:
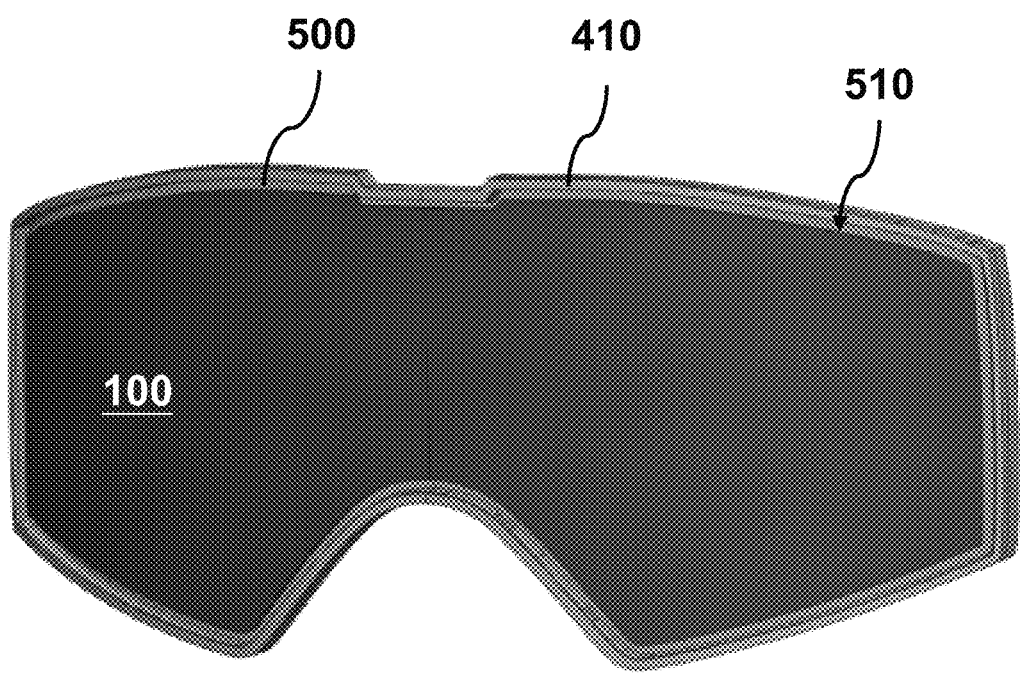
FIG. 6 is an inner sub-frame housing of an exemplary frame assembly with a laminated lens fitted therein, according to some embodiments.
Figure 7:
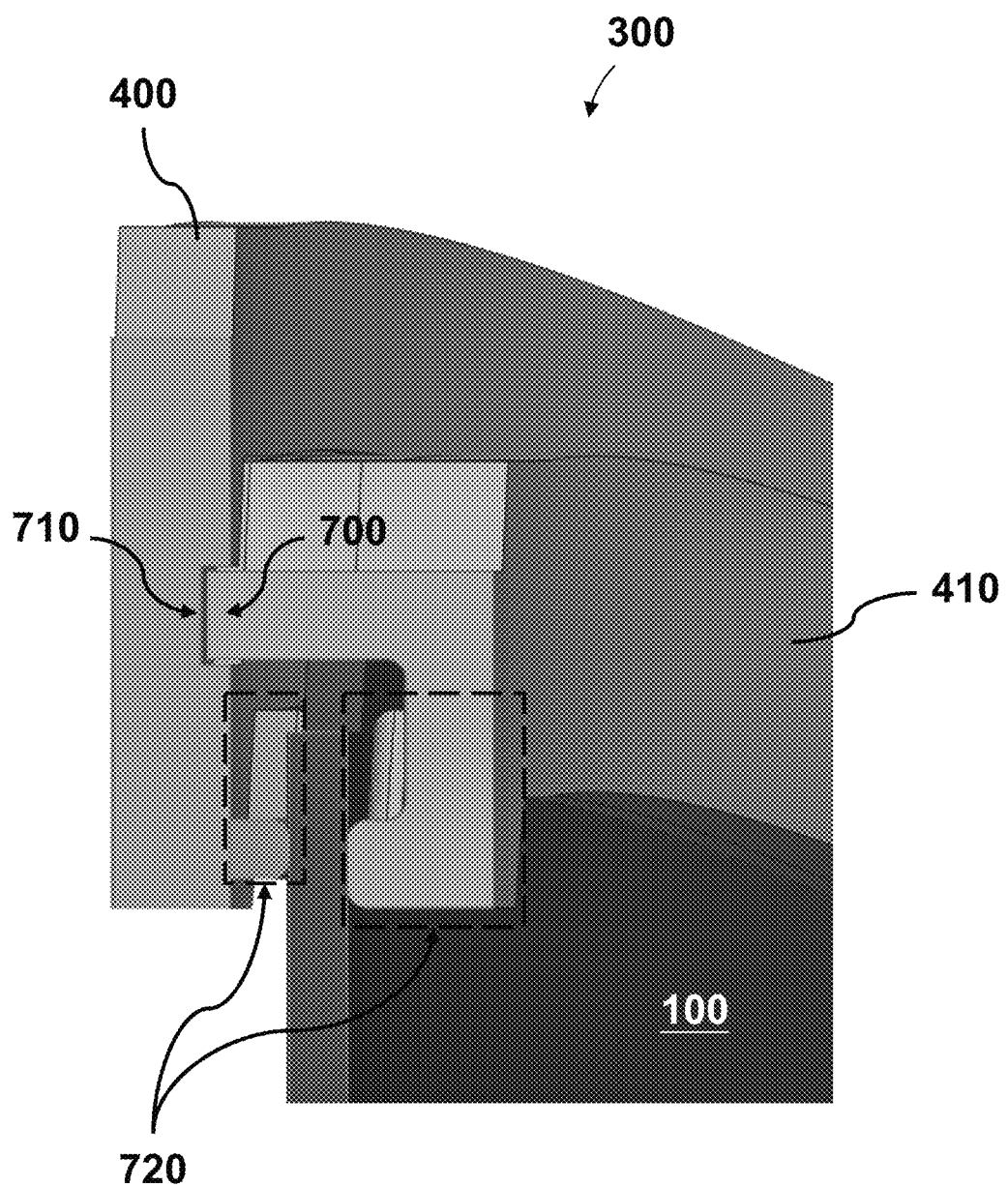
FIG. 7 is an isometric view of a laminated lens mechanically attached to an exemplary frame assembly, according to some embodiments.
Figure 8:
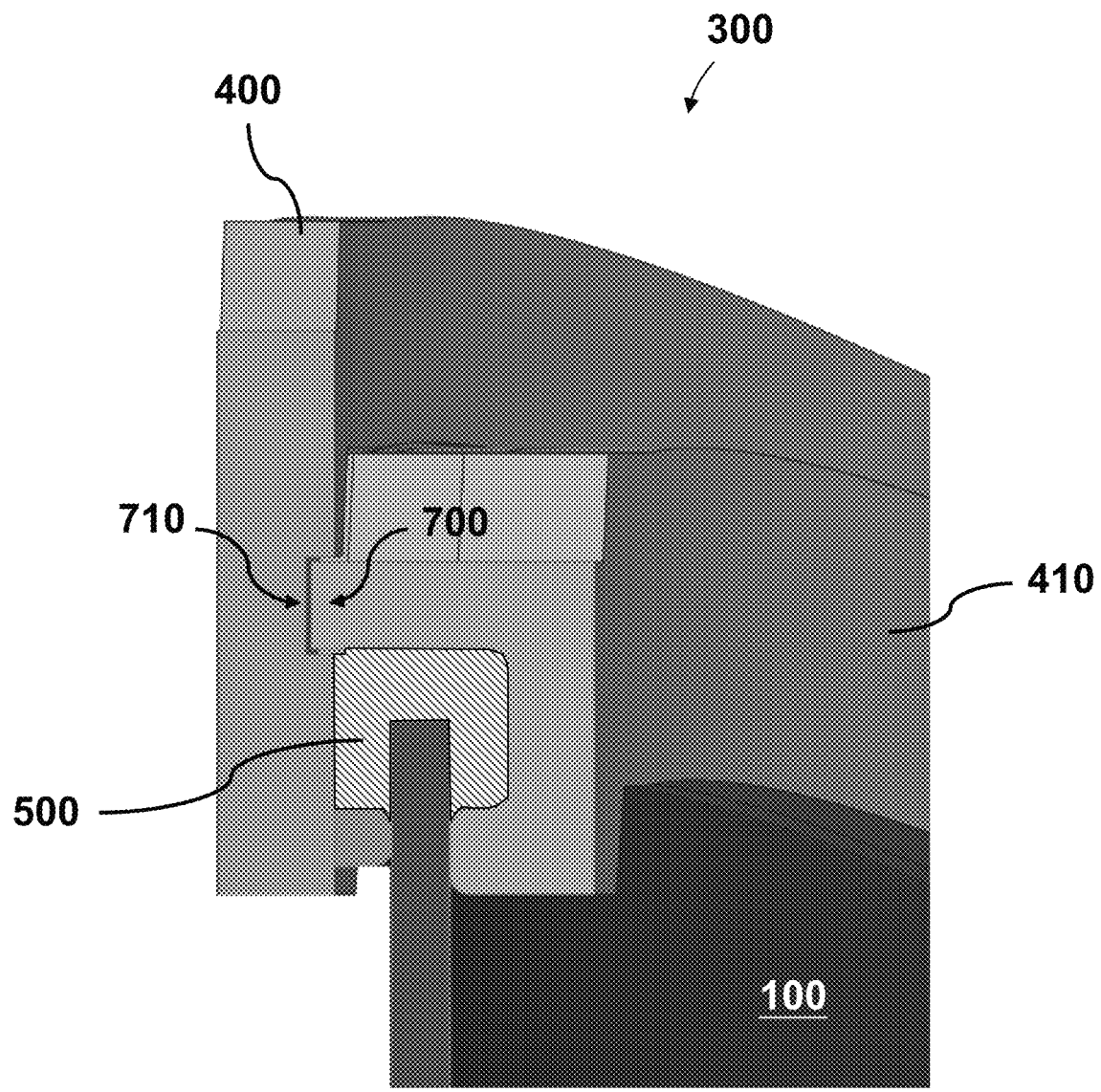
FIG. 8 is an isometric view of a laminated lens chemically bonded and mechanically attached to an exemplary frame assembly, according to some embodiments.

Laminated lens 100 is placed on inner sub-frame housing 410 so that the edges of laminated lens 100 can rest inside groove 510, as shown in FIGS. 6 and 7. Referring to FIG. 7, inner sub-frame housing 410 can feature one or more protrusions 700 above groove 510 configured to align and fit to respective grooves 710 of outer sub-frame housing 400. In this way, structural features of the inner sub-frame housing are complementary to respective structural features of the outer sub-frame housing. Further, the inner and outer sub-frames 410 and 400 can feature support elements (e.g., fingers) 720 at, for example, the four corners of the sub-frames. When laminated lens 100 is placed within frame 300, support elements 700 rest against the respective back and front edges of laminated lens 100 to secure it in place. According to some embodiments, support elements 700 provide additional mechanical support to laminated lens 100. When laminated lens 100 is placed on inner sub-frame housing 410, glue layer 500 can cover a front and a back edge portion of laminated lens 100, sealing the edges of laminated lens 100. In the illustration of FIG. 7, glue layer 500 has been omitted for clarity. FIG. 8 shows the assembly of FIG. 7 with glue layer 500, according to some embodiments.

In some embodiments, outer sub-frame housing 400 is configured to securely fasten (e.g., snap onto) to inner sub-frame housing 410, so that laminated lens 100 is mechanically clamped to frame 300. Additionally, glue layer 500 can chemically bond frame 300 to lens 100. Further, inner and outer sub-frame housings 410 and 400 can include additional design elements that can improve rigidity of frame 300.

The configuration described above is exemplary and should not be considered limiting. For example, outer sub-frame can be shaped so that it is complementary to the inner sub-frame. Therefore, alternative configurations for the assembled parts (e.g., outer sub-frame housing 400, inner sub-frame housing 410, and laminated lens 100) that provide both mechanical support and chemical boding between frame 300 and laminated lens 100 are within the spirit and scope of this disclosure. Further, in some embodiments, laminated lens 100 can be replaced with another laminated lens. In other words, laminated lens 100 can be exchangeable in frame 300. In such an embodiment, glue layer 500 may not be used.

EXAMPLE EMBODIMENTS (1) An electrochromic lens for an eyewear comprising a first lens element comprising: a first electrically conductive layer over a first substrate; a first busbar over a an edge portion of the first electrically conductive layer; a first electrochromic layer over the first busbar and the first electrically conductive layer; a second lens element comprising: a second electrically conductive layer over a second substrate; a second busbar over an edge portion of the second electrically conductive layer; a second electrochromic layer over the second busbar and the second electrically conductive layer; a bonding layer disposed between the first and second electrochromic layers; a first stack of opaque functional layers substantially aligned with the first busbar and positioned between the bonding layer and the first electrochromic layer at an edge of the first lens element; and a second stack of opaque functional layers substantially aligned with the second busbar and positioned between the bonding layer and the first electrochromic layer at another edge of the first lens element.

(2) A lens for an eyewear comprising a first lens element comprising: a first electrically conductive layer; a first busbar over a an edge portion of the first electrically conductive layer; a first electrochromic layer over the first busbar and the first electrically conductive layer; a second lens element comprising: a second electrically conductive layer; a second busbar over an edge portion of the second electrically conductive layer; a second electrochromic layer over the second busbar and the second electrically conductive layer; a bonding layer disposed between the first and second electrochromic layers; a first functional layer substantially aligned with the first busbar and positioned between the bonding layer and the first electrochromic layer at an edge of the first lens element; and a second functional layer substantially aligned with the second busbar and positioned between the bonding layer and the first electrochromic layer at another edge of the first lens element.

(3) An electrically conductive lens for an eyewear comprising: a first lens element comprising: a first electrically conductive layer and a first busbar over a an edge portion of the first electrically conductive layer; a second lens element comprising: a second electrically conductive layer and a second busbar over an edge portion of the second electrically conductive layer; an adhesive electrolyte layer disposed between the first and second lens elements; one or more opaque functional layers between the adhesive electrolyte layer and the first electrically conductive layer, wherein each of the one or more opaque layers is substantially aligned with either the first or the second busbar.

(4) The lens of all the previous embodiments, wherein each of the first and second busbars electrically connect the first and second electrically conductive layers and/or the first and second electrochromic layers respectively to an external power supply.

(5) The lens of all the previous embodiments, wherein the external power supply comprises a rechargeable or a non-rechargeable battery.

(6) The lens of all the previous embodiments, wherein each of the first and second busbars comprises silver, copper, gold, or aluminum.

(7) The lens of all the previous embodiments, wherein each of the first and second electrically conductive layers is transparent to visible light and comprise indium tin oxide (ITO), fluorine doped tin oxide (FTO), indium gallium zinc oxide (IGZO), doped zinc oxide.

(8) The lens of all the previous embodiments, wherein the adhesive electrolyte layer comprises an electrolyte that is cured when exposed to an ultraviolet (UV) radiation.

(9) The lens of all the previous embodiments, further comprising: an anti-fog layer disposed in the second lens element over the second substrate and opposite to the second conductive layer;

(10) The lens of embodiment 9, wherein the anti-fog layer comprises cellulose acetate propionate (CAP).

(11) The lens of embodiments 8 and 9, wherein each of the first and second substrates comprises one or more of polycarbonate (PC), nylon, polyurethane, polyethylene, polyethylene terephthalate (PET), polyimide, acrylic, MYLAR®, clear glass, doped glass, or filtered glass.

(12) The lens of all previous embodiments, wherein the first and second electrically conductive layers comprise heating elements for the lens.

(13) An eyewear assembly comprising: the lens of all previous embodiments; a sub-frame assembly covering an edge and a portion of a top surface of the lens, wherein the sub-frame assembly covering the portion of the top surface of the lens covers the first and second busbars from a wearer's view; and a bonding agent disposed between the sub-frame assembly and the lens.

(14) The eyewear assembly of embodiment 13, wherein the frame assembly is a rimless, faceless, semi-orbital, or full orbital eyewear frame.

(15) The assembly of embodiment 12, wherein the bonding agent comprises epoxy glue that protects the first and the second lens elements of the lens from water, moisture and dust.

(16) A frame assembly for an electrically conductive lens comprising: an inner sub-frame housing having a protrusion positioned above a first groove, wherein each of the protrusion and the first groove are formed on a peripheral edge of the inner sub-frame housing; an outer sub-frame housing with a second groove on a peripheral edge of the outer sub-frame housing, wherein the outer sub-frame housing is configured to fasten onto the inner sub-frame housing so that the protrusion of the inner sub-frame housing fits into the second groove of the outer sub-frame housing; an electrically conductive lens having a peripheral edge within a space formed by a surface of the outer sub-frame housing and the first groove of the inner sub-frame housing; and a bonding agent disposed into the space that surrounds the peripheral edge of the electrically conductive lens.

(17) The frame assembly of embodiment 16, wherein the electrically conductive lens is mechanically secured and/or chemically bonded between the inner and outer sub-frame housings.

(18) The frame assembly of embodiments 16 and 17, wherein the bonding agent comprises an epoxy glue that protects the electrically conductive lens from water, moisture and dust.

(19) The frame assembly of embodiments 16-18, wherein the electrically conductive lens comprises two electrochromic layers; two electrically conductive layers; at least one busbar positioned at the peripheral edge of the electrically conductive lens; and optionally at least one metal oxide layer positioned at the peripheral edge of the electrically conductive lens.

(20) The frame assembly of embodiment 19, wherein the at least one busbar and/or the at least one metal oxide layer are covered by the frame assembly and are not visible when the frame assembly is worn.

(21) The frame assembly of embodiments 16-20, wherein the inner sub-frame housing is proximal to a wearer when the frame assembly is worn.

(22) The frame assembly of embodiments 16-21, wherein the frame assembly comprises general-purpose eyewear, special-purpose eyewear, sunglasses, driving glasses, sporting glasses, goggles, helmets, visors, indoor eyewear, outdoor eyewear, vision-correcting eyewear, contrast-enhancing eyewear, or eyewear designed for a combination of purposes

(23) The frame assembly of embodiments 16-22, further comprising a control logic unit, a control circuit unit, one or more sensors, and a user interface element that allows a user to activate or deactivate electrically-powered components of the electrically conductive lens.

(24) The frame assembly of embodiments 16-23, wherein the outer and inner sub-frame housings comprise at least one metal, composite, or molded thermoplastic material.

(24) The frame assembly of embodiments 15-23, wherein the frame assembly is configured to further fit within a rimless, faceless, semi-orbital, or full orbital eyewear frame.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance provided herein.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

It is to be appreciated that the Detailed Description section, and not the Abstract section, is intended to be used to interpret the following claims. The Abstract section may set forth one or more, but not all exemplary embodiments, of the disclosure, and thus, are not intended to limit the disclosure and the appended claims in any way.

What is claimed is:

1. A frame assembly for an electrically conductive lens comprising:
    an inner sub-frame housing defining a lens cavity and having a protrusion positioned above a first groove, wherein the protrusion is formed on and the first groove is formed on and extends along a peripheral edge of the inner sub-frame housing;
    an outer sub-frame housing having a second groove on a peripheral edge of the outer sub-frame housing, wherein the outer sub-frame housing is configured to fasten onto the inner sub-frame housing so that the protrusion of the inner sub-frame housing fits into the second groove of the outer sub-frame housing;
    the electrically conductive lens having a peripheral edge within a space formed by a surface of the outer sub-frame housing and the first groove of the inner sub-frame housing; and
    a bonding agent disposed into the first groove.
2. The frame assembly of claim 1, wherein the electrically conductive lens is mechanically secured between the inner and outer sub-frame housings.
3. The frame assembly of claim 1, wherein the bonding agent chemically bonds the electrically conductive lens to the inner and outer sub-frame housings.
4. The frame assembly of claim 1, wherein the bonding agent comprises epoxy glue.
5. The frame assembly of claim 1, wherein the electrically conductive lens comprises:
    two electrochromic layers;
    two electrically conductive layers; and
    at least one busbar positioned at the peripheral edge of the electrically conductive lens.
6. The frame assembly of claim 5, wherein the electrically conductive lens further comprises:
    an electrically conductive opaque functional layer substantially aligned with the at least one busbar.
7. The frame assembly of claim 5, wherein the at least one busbar is covered by the frame assembly and is not visible when the frame assembly is worn.
8. The frame assembly of claim 1, wherein the electrically conductive lens comprises:
    an electrolyte layer;
    at least one electrically conductive layer; and
    one or more electrically conductive opaque functional layers between the electrolyte layer and the at least one electrically conductive layer.
9. The frame assembly of claim 1, wherein the inner sub-frame housing is proximal to a wearer when the frame assembly is worn.
10. The frame assembly of claim 1, wherein the inner sub-frame housing and the outer sub-frame housing comprise support elements positioned at respective corners of the inner sub-frame housing and the outer sub-frame housing.
11. The frame assembly of claim 1, further comprising:
    a power source configured to provide power to one or more elements of the electrically conductive lens.
12. The frame assembly of claim 1, further comprising:
    a distal lens element configured to be attached to the frame assembly, wherein the distal lens element is distal to a wearer when the frame assembly is worn.
13. An eyewear comprising the frame assembly of claim 1.
14. A frame chassis comprising:
    a removable modular sub-frame attached to the frame chassis, wherein the removable modular sub-frame comprises:
        an inner sub-frame housing defining a lens cavity and having a protrusion positioned above a first groove, wherein the protrusion is formed on and the first groove is formed on and extends along a peripheral edge of the inner sub-frame housing;
        an outer sub-frame housing having a second groove on a peripheral edge of the outer sub-frame housing, wherein the outer sub-frame housing is configured to fasten onto the inner sub-frame housing so that the protrusion of the inner sub-frame housing fits into the second groove of the outer sub-frame housing;
        an electrically conductive lens having a peripheral edge within a space formed by a surface of the outer sub-frame housing and the first groove of the inner sub-frame housing; and
        a bonding agent disposed into the first groove.
15. A frame assembly comprising:
    a lens comprising at least one busbar, at least one electrically conductive layer, and at least one conductive opaque functional layer, wherein the at least one busbar is substantially aligned with the at least one conductive opaque functional layer, and wherein the at least one busbar is between the at least one electrically conductive layer and the at least one conductive opaque functional layer;
- a sub-frame housing covering an edge and a portion of a top surface of the lens, wherein the sub-frame housing covering the portion of the top surface of the lens covers the at least one busbar from a wearer's view; and
- a bonding agent layer disposed between the sub-frame housing and the lens, wherein the bonding agent layer seals respective edges of the at least one busbar, the at least one electrically conductive layer, and the at least one conductive opaque functional layer.

16. The frame assembly of claim 15, wherein the sub-frame housing has a first groove and wherein an edge of the lens rests inside the first groove.

17. The frame assembly of claim 15, wherein the bonding agent layer covers a front and a back edge portion of the lens.

18. The frame assembly of claim 15, wherein the sub-frame housing is a first sub-frame housing, the frame assembly further comprising:
- a second sub-frame housing configured to fasten into the first sub-frame housing.

19. The frame assembly of claim 15, wherein the bonding agent comprises epoxy glue.

20. The frame assembly of claim 15, wherein the at least one busbar and the at least one conductive opaque functional layer are stacked at a peripheral edge of the lens.

21. The frame assembly of claim 10, wherein the support elements rest against respective back and front edges of the electrically conductive lens.

22. The frame assembly of claim 1, wherein the protrusion extends along the peripheral edge of the inner sub-frame housing.

* * * * *